(No Model.) 2 Sheets—Sheet 1.
J. MUNDELL & W. J. GORDON.
MACHINE FOR SHAVING, CONDENSING, AND ASSORTING BLANKS FOR SHOE SOLES.
No. 267,572. Patented Nov. 14, 1882.
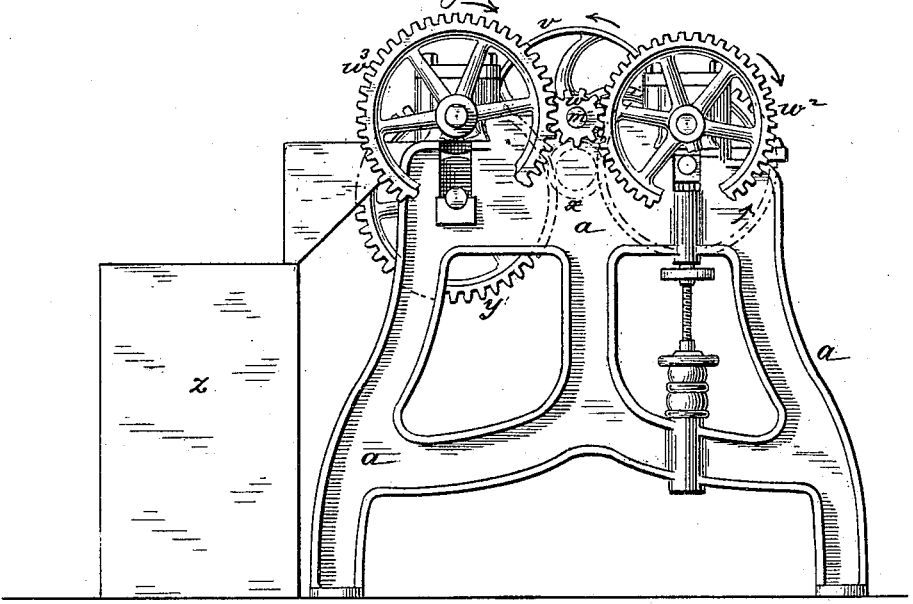
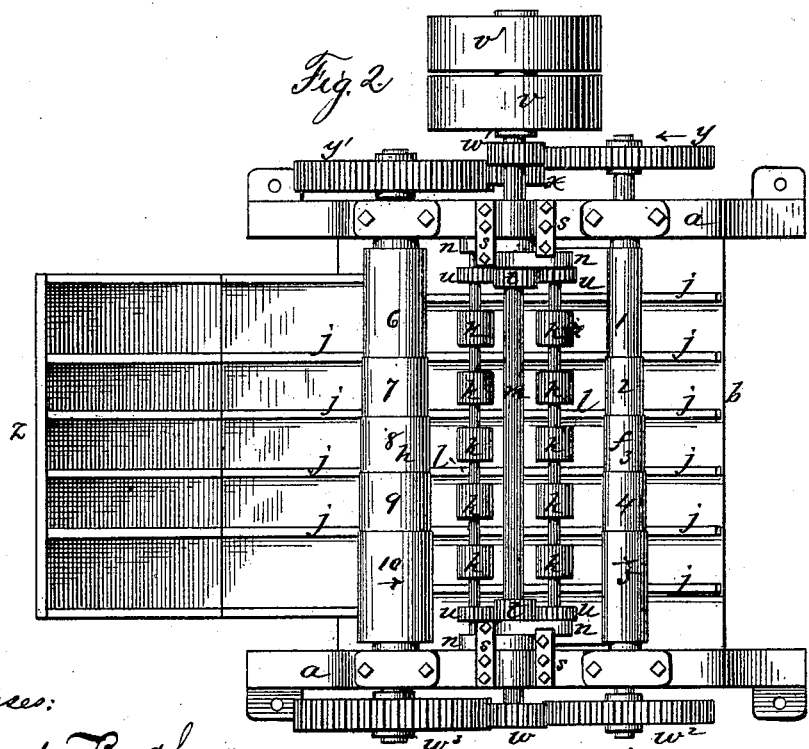

(No Model.)  2 Sheets—Sheet 2.
J. MUNDELL & W. J. GORDON.
MACHINE FOR SHAVING, CONDENSING, AND ASSORTING BLANKS FOR SHOE SOLES.
No. 267,572.  Patented Nov. 14, 1882.
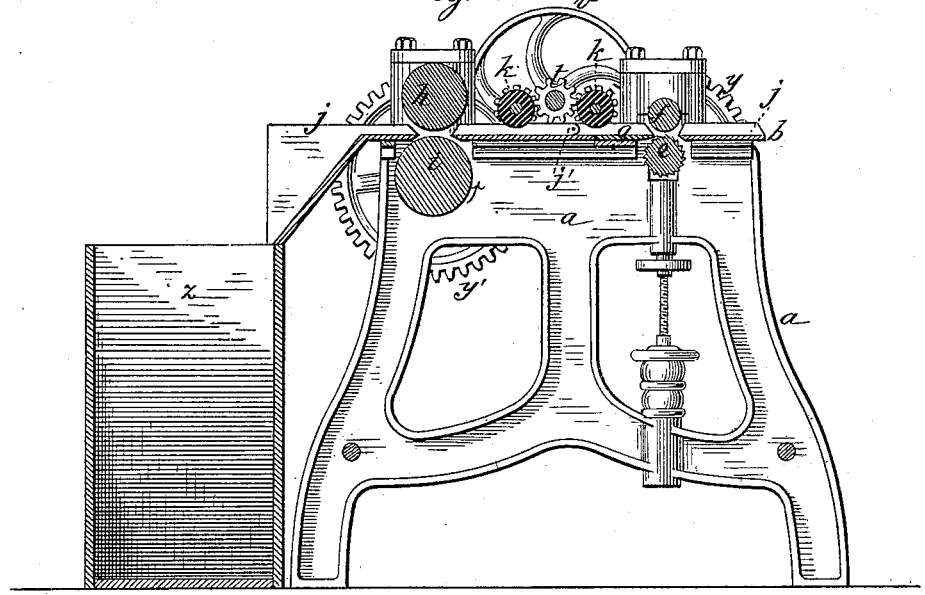
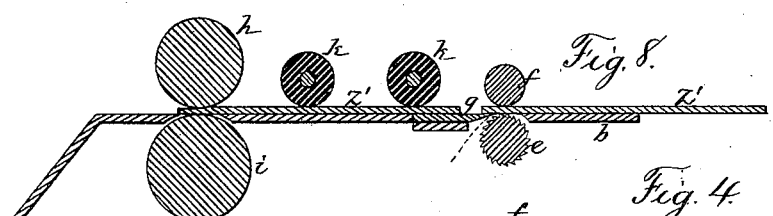
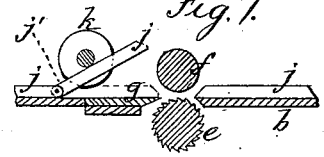
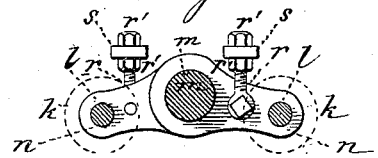
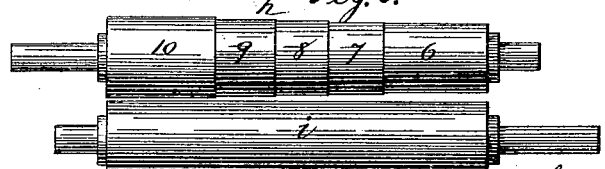
Witnesses:
Edmund Boodhag
Wm. N. Finckel
Inventors:
James Mundell
William J. Gordon
by Johnson & Johnson
Attys

UNITED STATES PATENT OFFICE.

JAMES MUNDELL AND WILLIAM J. GORDON, OF PHILADELPHIA, PA., ASSIGNORS OF ONE-THIRD TO JOHN MUNDELL, OF SAME PLACE.

MACHINE FOR SHAVING, CONDENSING, AND ASSORTING BLANKS FOR SHOE-SOLES.

SPECIFICATION forming part of Letters Patent No. 267,572, dated November 14, 1882.

Application filed August 2, 1882. (No model.)

*To all whom it may concern:*

Be it known that we, JAMES MUNDELL and WILLIAM J. GORDON, citizens of the United States, residing at Philadelphia, county of Philadelphia, State of Pennsylvania, have invented new and useful Improvements in Machines for Shaving, Condensing, and Assorting Blanks for Shoe-Soles, of which the following is a specification.

Our invention is directed to the production of a machine for effecting the several operations of shaving, condensing, and assorting leather blanks for shoe-soles as to their thickness in one continuous operation, whereby to effect in a highly economical manner the operations in one machine of shaving and smoothing sole-blanks of different thicknesses and delivering them by the feed of such operation to a feed device operating to present the shaved sole-blanks of different thicknesses to condensing-rollers adapted to receive the different thicknesses, and from which they are delivered assorted according to their thickness, ready for use in the manufacture of boots and shoes.

Hitherto the sole-blanks have been shaved and assorted according to their thickness by a graded feed-roller and a table having partitions corresponding to the different diameters of the roller; but the operation of condensing them has been separate, each operation requiring a special machine having distinct driving mechanism, and requiring a man to conduct the work. Our invention saves the cost of one of these machines, the wages of a workman, and effects a large saving in time in the production of work by one continuous operation over such production by separate and distinct machines. Moreover, in this separate operation of condensing the soles a special adjustment of the rollers for the different thicknesses must be made, and soles of one thickness can only be condensed under one adjustment of the rollers, thus making a loss of time. This, so far as we know, is a necessity in every leather-rolling machine now in use.

By our invention the sole-blanks are delivered, assorted as to their thickness, in a continuous feed from the shaving-knife to the rollers, which condense them, and which require no adjustment to suit the different thicknesses, both operations being effected upon the same table and by the same driving-shaft. In such organization the feed of the sole-blanks is made from one operation to the other by an intermediate feed device of elastic rolls, whereby to act alike upon blanks of different thicknesses, there being one or more such elastic feed-rolls arranged in the paths for the assorted sole-blanks, operating to receive the blanks from the feed-rollers of the shaving-knife and to hold them down and feed them in position to enter the condensing-rollers without regard to the order of such feed.

A machine organized for the separate and distinct operations stated is illustrated in the accompanying drawings, in which—

Figure 1 represents a side elevation, showing the gearing of one side of the machine; Fig. 2, a top view, showing the graded rollers, the table-guideways corresponding to the different diameters thereof, and the intermediate feed mechanism for delivering the sole-blanks from the shaving-knife to the condensing-rollers; Fig. 3, a vertical section of the same, showing the relation of the rollers for effecting the continuous operation of shaving and condensing the sole-blanks; Fig. 4, an elevation of graded and ribbed rollers through which the sole-blanks are fed to the shaving-knife; Fig. 5, an elevation of the graded and plain rollers for condensing the shaved and sorted sole-blanks in their continuous feed from the shaving-knife. Fig. 6 shows a detail of the adjustable arms which carry the elastic feed-rolls; Fig. 7, a detail showing the hinged sections of the table-partitions to allow of the removal and replacement of the shaving-knife, and Fig. 8 a section showing the continuous feed of the sole under the separate operations of shaving and condensing.

The frame may be of any suitable construction, preferably of two iron standards, *a a*, made firm and strong by cross-bars, supporting a table, *b*, between them at the top, and in which the several rollers are mounted in suitable boxes in proper relation to said table.

Near the front of the table are arranged the rollers for feeding the sole-blanks to the shaving-knife, while the rollers for condensing the shaved sole-blanks are arranged at the rear of the table, and intermediately the feed-rolls are placed for receiving the blanks from the shaving-knife and delivering them to the condensing-rollers. The front feeding-rollers, *e f*, are arranged one above the other within an opening in the table, and a stationary knife, *g*, is fixed to the table in rear of said rollers, so that its cutting-edge will be parallel with and a little above the top of the lower roller, as shown in Fig. 3, the object being to take off a shaving from the rough side of the sole-blank, to leave a smooth surface with as little loss in the thickness of the piece as possible. The lower roller, *e*, has a longitudinally-ribbed surface, with its upper portion about on a level with the plane of the table, while the upper roller, *f*, is formed of cylinders 1 2 3 4 5, of different diameters, the smallest at one end and the largest at the other, the intermediate ones being of uniform gradations, forming spaces of different widths between the rollers, for receiving the blank soles according to their different thicknesses and delivering them shaved assorted according to such different thicknesses, as shown in Fig. 4. The lower ribbed roller is mounted in yielding bearings to allow it to yield slightly to the thickness of the blank.

The condensing-rollers *h i* are arranged at the rear side of the table and at a distance from the front feed-rollers greater than the length of the sole-blank *z'*, so that the latter will be free of the shaving action of the knife before it is seized by the condensing-rollers, as shown in Fig. 8. These condensing-rollers are non-adjustable and arranged within an opening in the table, one above the other, the upper one, *h*, being graded to form cylinders 6 7 8 9 10, of different diameters, so that its different diameters will increase in corresponding relation to the increasing diameters of the top front feed-roller, for the purpose of receiving and condensing the shaved sorted blanks from the front assorting feed-rollers. The lower condensing-roller, *i*, is plain and of uniform diameter, so as to form spaces of different widths between these rollers for receiving the shaved blanks according to their different thicknesses. For this purpose the table is provided with partitions *j* in line with the divisions of the grades of the rollers, forming guideways corresponding to these divisions, so as to direct the sole-blanks of different thicknesses from the front graded roller into spaces formed by the condensing-rollers, corresponding with the spaces of equal width formed by the front feed-rollers.

To effect the feed of the sole-blanks from the operation of shaving to the operation of condensing them, one or more feed-rolls, *k*, are arranged in the guideways, which receive the sole-blanks from the action of the knife, hold them level, and enter them between the condensing-rollers, as shown in Fig. 8. These intermediate feed-rolls are of rubber, and do not cross the guideway-partitions, but are mounted upon small shafts *l*, arranged parallel to each other on each side of the main driving-shaft *m*, which also crosses the table above the guideway-partitions, as shown in Figs. 2 and 3. These elastic feed-rolls *k*, although corresponding in number to the different diameters of the graded rollers, may be of equal diameters, as shown, and they are adjusted sufficiently near the table to take hold of and feed the different thicknesses of sole-blanks beneath them. These feed-roll shafts *l* are mounted in the ends of arms *n*, hung adjoining each other upon the main driving-shaft *m*, between the outside table-guides, *j*, and the frame-standards. The roll-bearing ends of these arms *n* are suspended by screw-hangers *r*, pivotally connected to said arms, and, passing up through holes in plates *s* projecting inward from the top of each frame-standard, are adjustably secured by nuts *r'* both above and below said plates *s*, as shown in Fig. 6, whereby these elastic feed-rolls are properly set and adjusted down as they wear. They are driven from the main driving-shaft by pinions *t t* thereon meshing with pinions *u* on the ends of each roll-shaft. I prefer to gear and drive these feed-roll shafts at each end, so as to equalize the strain thereon.

The main shaft *m* drives also the front feed-rollers and the rear condensing-rollers. It is mounted in boxes upon the tops of the frame-standards, and is driven by a band-pulley, *v*, a loose pulley, *v'*, being also placed upon said shaft at one end. Outside of the frame-standards this main shaft has on each end a pinion, *w w'*, one, *w*, of which meshes with spur-gears $w^2$ and $w^3$ on the ends of the graded rollers, while the other pinion, *w'*, meshes with a long pinion, *x*, mounted on a stud in the frame, which engages with spur-gears *y* and *y'* on the shafts of the lower feed-roller, *e*, and the lower condensing-roller, *i*, whereby all the rollers, being turned in the same direction, effect the continuous and simultaneous operations of shaving and condensing sole-blanks sorted according to their different thicknesses.

A box, *z*, at the rear end of the table has partitions corresponding to the guideways of the table, and forming receptacles into which the sorted sole-blanks are collected, the guideways joining this receiving-box by an incline plane in rear of the condensing-rollers.

The feed-rollers and the condensing-rollers are preferably made of steel, and the latter are of larger diameter than the former, so that in the operation of condensing the sole-blanks the feed will be faster than in the operation of shaving the blanks, and thus avoid choking the machine, as the condensing-rollers will deliver faster than the feed-rollers of the shaving-knife. The shavings from the knife pass into a box beneath the table.

It will be understood that the sole-blanks are first soaked in water and placed upon the table *b* by the attendant, who determines by sight under which part of the graded feed-roller he shall put it to make the least loss in the thickness of shaving, the blanks being then carried forward and delivered shaved and compressed, being thus made smooth, stiff, and firm in one operation and by one machine.

The knife $g$ is secured to the table by screws, and can be removed and sharpened when necessary. As the table-partitions extend over the knife, that portion of each is hinged at $j'$ to allow them to be turned up sufficiently to remove and replace the knife, the small roller-shafts $l$ admitting of the raising of such hinged portions, as shown in Fig. 7, so that the feed-rolls remain in their fixed relation to the table.

We claim—

1. The combination, with the non-adjustable condensing-rollers $h\ i$, the top one being graded and the lower one of uniform diameter, of the front feed-rollers, $e\ f$, the top one being graded and the lower one ribbed, the intermediate adjustable rubber feed-rolls, the knife $g$, and the table having guideways corresponding to the several divisions of the graded rollers, substantially as described, for the purpose specified.

2. The combination, substantially herein described, with the ribbed and graded rollers $e\ f$, the graded and plain rollers $h\ i$, a table having guideways corresponding to said graded-roller divisions, and a fixed knife, $g$, of the rubber feed-rolls $k$, arranged upon separate shafts in corresponding relation to the said graded-roller divisions, the main driving-shaft and mechanism for connecting it with the said rubber feed-roll shafts, the said front feeding-rollers, and the rear condensing-rollers, and adapted to operate the several rollers in the same direction, to render the operations of shaving, feeding, and condensing sole-blanks of different thicknesses continuous and simultaneous in one machine.

3. The combination, substantially herein described, of the front ribbed and graded rollers, $e\ f$, and the fixed knife with the non-adjustable rear graded and plain rollers, $h\ i$, forming the condensing-rollers, a yielding feed device, arranged between these front and rear sets of rollers, and the table having guideways corresponding with the several divisions of the graded rollers $f\ h$, and within which the yielding feed-rolls are arranged to receive the shaved graded sole-blanks and deliver them to the condensing-rollers.

4. The combination, with the front feed-rollers, $e\ f$, the fixed knife $g$, the rear condensing-rollers, $h\ i$, and the intermediate elastic feed-rolls, $k$, the said top rollers, $f\ h$, being graded, of a table divided by partitions $j$, corresponding to the graded divisions of the top rollers, and having hinged sections overlying the said knife, substantially as described, for the purpose specified.

5. A machine for shaving and condensing sole-blanks, consisting of the feed-rollers $e\ f$, the knife $g$, the non-adjustable condensing-rollers $h\ i$, the intermediate rubber feed-rolls, $k$, the top feed-roller and the top condensing-roller being graded and the table having guideways corresponding to the gradations thereof, and mechanism for actuating the several rollers from a main driving-shaft, substantially as herein set forth.

6. In combination, in a machine for shaving and condensing sole-blanks for boots and shoes, the top front and rear graded rollers, $f\ h$, the ribbed roller $e$, the roller $i$, having an unbroken surface, the fixed knife $g$, the partitioned table, the elastic feed-rolls $k$, having their shafts mounted in pivoted arms $n\ n$, supported by adjusting-hangers $r$, and geared at each end with the main driving-shaft by the gears $t\ u$, and the gears connecting the said rollers $e\ f\ h\ i$ with the main driving-shaft, substantially as herein set forth.

7. That improvement in the art of preparing sole-blanks for use in the manufacture of boots and shoes which consists in shaving the under side of the blank, and feeding and condensing the same under an accelerated movement, and at one continuous operation, as specified.

In testimony whereof we have hereunto set our hands in the presence of two subscribing witnesses.

JAMES MUNDELL.
WILLIAM J. GORDON.

Witnesses:
THEO. D. RAND,
J. H. WILSON.